Aug. 15, 1933.  A. H. CANDEE  1,922,756
METHOD OF AND MACHINE FOR PRODUCING GEARS
Filed Dec. 20, 1929  2 Sheets-Sheet 1

INVENTOR
Allan H. Candee
BY
his ATTORNEY

Aug. 15, 1933.  A. H. CANDEE  1,922,756
METHOD OF AND MACHINE FOR PRODUCING GEARS
Filed Dec. 20, 1929  2 Sheets-Sheet 2

INVENTOR
Allan H. Candee
BY
his ATTORNEY

Patented Aug. 15, 1933

1,922,756

UNITED STATES PATENT OFFICE 1,922,756

METHOD OF AND MACHINE FOR PRODUCING GEARS

Allan H. Candee, Rochester, N. Y., assignor to Gleason Works, Rochester, N. Y., a Corporation of New York Application December 20, 1929
Serial No. 415,422

9 Claims. (Cl. 90—9)

The present invention relates to the art of generating irregular gears and particularly to the art of generating eccentric or approximately elliptical gears.

The primary purpose of this invention is to provide a better and simpler method of generating irregular gears and more particularly gears of approximately elliptical form. To this end, improvements have been made not only aiming at simplification of the generating process and of the machines employed in generating such gears but which provide a simplified form of cutter and an improved form of gear also.

By the term "irregular gears" I mean gears having teeth which are arranged otherwise than concentric with the axis about which the gear is intended to rotate.

Figure 1:
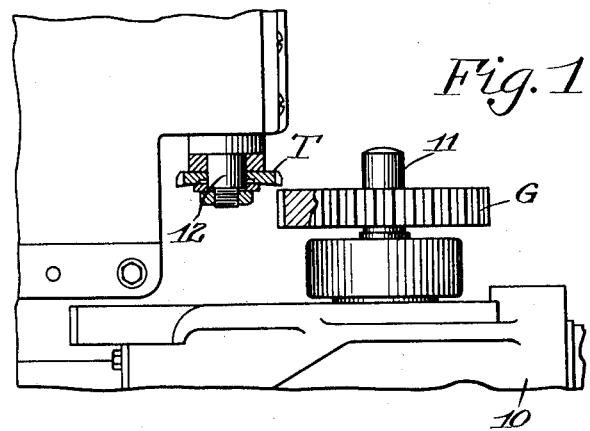
Figure 1 is a fragmentary view of a Fellows' gear shaper, showing how such a machine may be employed in practicing the present invention.

With the present invention, both the cutter and the gear blank to be generated are rotated at uniform velocities during the generating process, and a relative movement is, also, produced which carries the cutting edges of the tool toward and away from the axis of the blank as the blank revolves about its axis. Either a hob, a gear-shaped cutter or a rack-shaped cutter may be employed as the cutting tool. Where a hob is employed, it is rotated in continuous engagement with the blank as usual, but is moved toward and away from the blank an integral number of times during each revolution of the blank and this movement of the hob toward and away from the blank is effected, preferably, under actuation of an eccentric. If a gear-shaped cutter is used as the cutting tool, one having uniform teeth is, preferably, employed and the movement of the cutter toward and away from the blank is preferably secured by mounting this cutter eccentrically of the axis of the cutter spindle. Where a rack-shaped tool is used the usual cutting and generating motions are employed with the addition of the alternate movement of tool relatively toward and away from the blank which characterizes this invention.

The preferred method of generating a gear according to this invention with a gear-shaped cutter will first be described in detail. 10 indicates the base or frame of a Fellows' gear shaper, 11 the work spindle of this machine and 12 the cutter spindle. The gear blank to be generated is designated at G. This may be of cylindrical shape or of generally elliptical shape as may be desired and depending on the amount of eccentricity of the cutter and eccentricity of the teeth to be cut in the blank. The blank may be secured to the work spindle 11 in any usual or suitable manner.

T designates the cutting tool. This tool has cutting teeth of uniform shape, arranged at equal distances around a common center.

In a Fellows' gear shaper of standard construction, the work spindle is driven continuously at a uniform velocity, the cutter spindle is reciprocated in an axial direction to impart a cutting movement to the tool, and simultaneously the cutter spindle is rotated at a uniform velocity. There is also a relative relieving movement between the tool and blank after each cutting stroke so that the cutter clears the blank on the idle up-stroke. In practicing the present invention, all these motions are employed but the cutter is either mounted eccentrically of the cutter spindle or some special means is provided for moving the cutter toward and away from the blank as the cutter and blank revolve together. In the illustrated embodiment the tool is mounted eccentrically on the cutter spindle. To this end, it is bored eccentrically, as indicated at 14, to receive the cutter spindle 12. It is secured to the cutter spindle by any usual or suitable means. Because the cutter is mounted eccentrically it is carried toward and away from the blank as the two revolve together and because of its simplicity this method of obtaining the desired movement is preferred.

Figure 4:
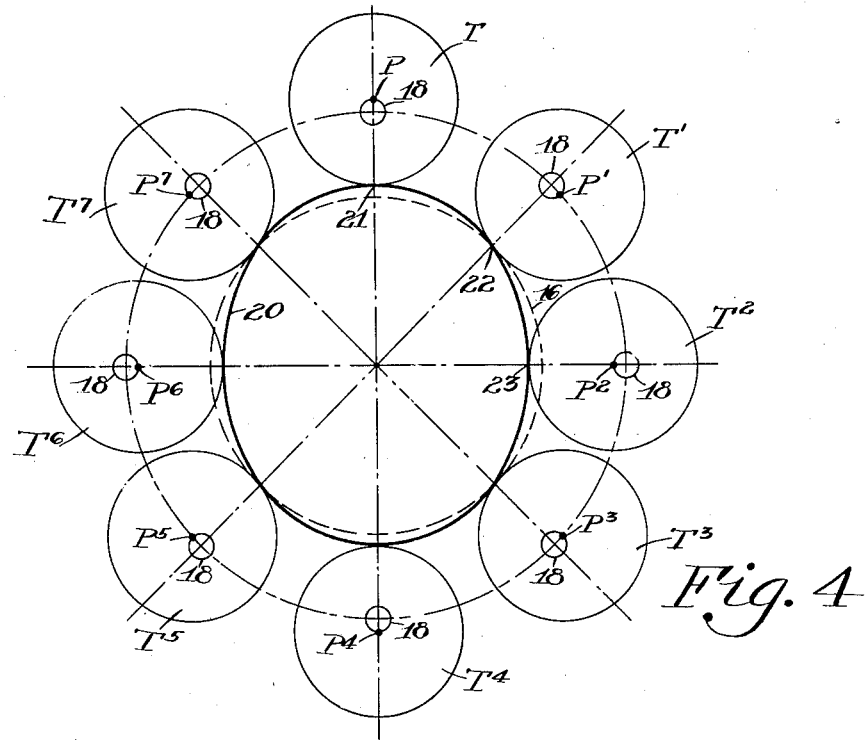
Figure 4 is a diagrammatic plan view showing the relative positions assumed by the cutter and blank during the generation of a gear according to the present invention with a gear-shaped cutter.

In the case of eccentrically mounted equal gears, which act in a manner similar to elliptical gears, there are two "high" points and two "low" points around the circumference of each gear. To generate such gears the number of teeth in the cutter must be half the number in the gear. Figure 4 illustrates clearly how such gears are generated. The dash circle 16 indicates a surface concentric to the axis of the blank, as, for instance, its pitch surface during generation, which will be cylindrical due to the uniform rotation of the blank and cutter in the generating operation. $T, T^1, T^2$, etc., indicate successive positions which the cutter assumes relative to the blank as the two roll together. The small circle 18 indicates the amount of eccentricity of the cutter. The successive positions of the geometric center of the cutter, as the cutter and blank roll together, are indicated by $P, P^1, P^2$, etc. If the cutter has half the number of teeth that there are to be cut in the blank, the cutter will make two revolutions in the time that it takes it to roll relatively around the blank. In these two revolutions, the point P will be moved toward the axis of the blank, then away from it, then toward it again and finally away from it. The relative movement of the cutter is somewhat as though a circle concentric to the geometric center of its teeth were continuously tangent to a curve in the gear of generally elliptical shape, such as designated at 20. So, with reference to the circle 16, the cutter is cutting deeper at the point 23 than at the point 21 or at the point 22 intermediate the points 23 and 21 and the cutter is cutting deeper at the point 22 than at the point 21, etc. Because of the relative movement of the cutting teeth toward and away from the blank, the teeth generated in the blank will be of different thicknesses measured on any circle concentric of the axis of the blank. The teeth of the blank will be of equal thickness, however, on some curve of the general shape indicated at 20.

Figure 2:
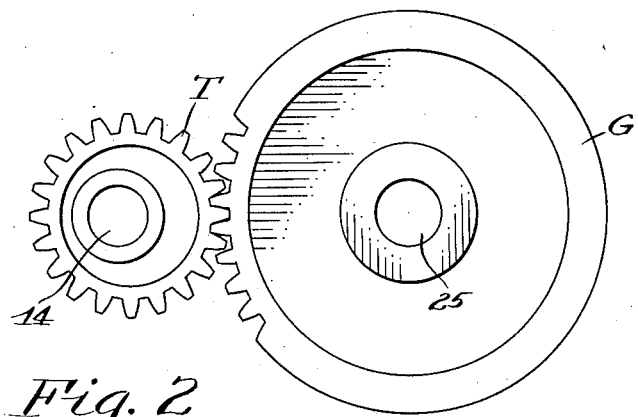
Figure 2 is a plan view, showing the relative positions of a gear-shaped cutter and a blank during the generation of a gear according to the present invention.

When a cylindrical blank is used, its bore may be concentric with its periphery, as shown at 25 in Figure 2 and in cutting such a blank, then, it will be mounted so that its axis coincides with the axis of the work spindle. In use, however, gears cut according to the present invention are mounted eccentrically. So, a cylindrical blank centrally bored would be mounted, for instance, on an eccentric bushing.

Figure 5:
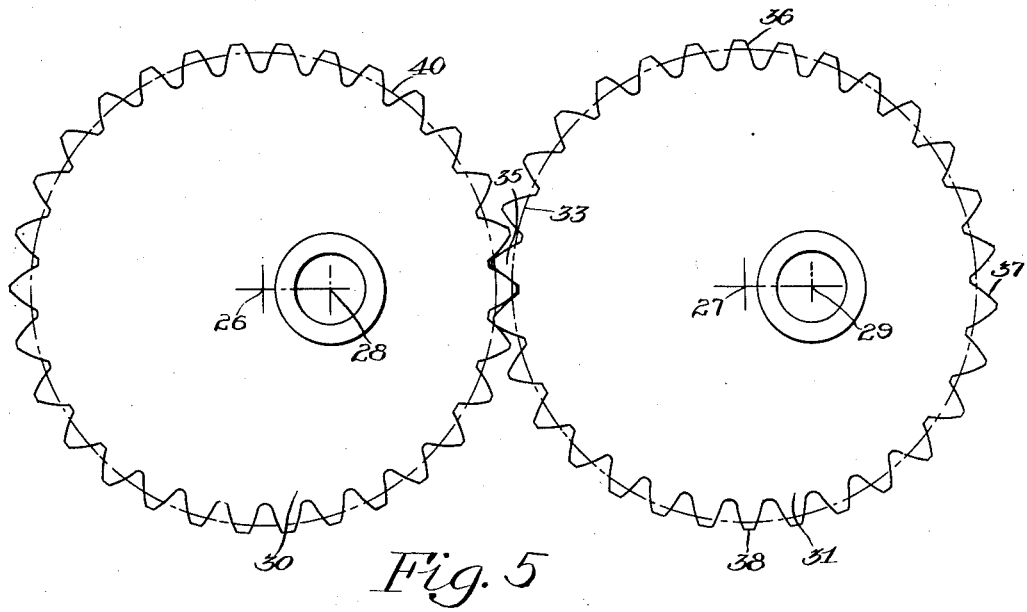
Figure 5 is a plan view showing a pair of gears in mesh which are generated according to the present invention.

A pair of gears such as may be generated according to this invention are shown in Figure 5. 26 and 27 designate, respectively, the centers on which the gears are generated and 28 and 29, the centers on which they operate. The two gears 30 and 31 are made alike. In fact, they may be cut simultaneously by securing both blanks at the same time to the work spindle. The differences in shape in the teeth of the gears are clearly illustrated in Figure 5. On the circle 33 concentric to the point 27, it will be seen that the tooth 35 is much thicker than the tooth 36, that the teeth between the tooth 35 and the tooth 36, taken in a clock-wise direction are of gradually decreasing thickness but from the tooth 36 to the tooth 37, the thickness of the teeth measured on the circle 33 increases again and the tooth 37 is of the same thickness measured on this circle as the tooth 35. The tooth 38 is of the same thickness on the circle 33 as the tooth 36 and the teeth decrease in thickness from the tooth 37 to the tooth 38 and increase in thickness from the tooth 38 to 35 considered in a clockwise direction. The same differences in the tooth thicknesses are true in the gear 30 considered on the circle 40 concentric of the generating axis 46 for the two gears are identical. When the eccentricity of the cutter is properly chosen and the gears themselves are mounted with the proper eccentricity, it is possible to provide a pair of gears which will run together without any back-lash.

Figure 3:
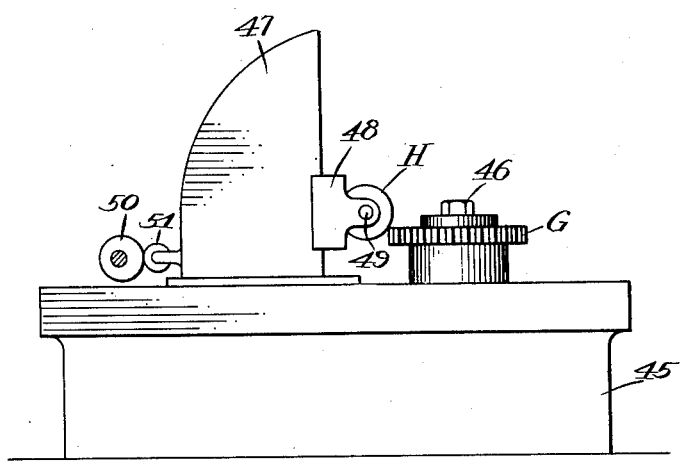
Figure 3 is a view illustrating diagrammatically the method of hobbing a gear with the present invention.

Gears cut according to the present invention need not be generated with a Fellows' cutter. They may be cut with a hob, as indicated in Figure 3. 45 designates the base or frame of the hobbing machine, 46 the work spindle, 47 a slidable upright or stanchion, 48 the hob slide or carrier, 49 the hob spindle and H the hob. One gear or both gears of a pair may be cut at a time.

In an ordinary hobbing machine, means is provided for rotating the hob and the work spindle in timed relation and in addition some means is provided for feeding the hob axially across the face of the blank. All of these motions will be employed in hobbing a gear according to the present invention and in addition some means will be provided for moving the hob toward and away from the axis of the blank during the cutting operation. This means may take the form of an eccentric 50 driven in time with the rotation of the work spindle and operating through a roller 51, which is secured to the upright 47, to move the upright toward and away from the work spindle during the cutting of the gear. The eccentric may be timed to make two or more revolutions per revolution of the work spindle.

If the hob were a multiple thread hob having, for instance, half the number of threads that there were teeth to be cut in the blank, it would be possible to mount the hob directly on an eccentric and secure the desired results.

While various modifications of the present invention have been described, it will be understood that the invention is capable of various other modifications. In general, it may be said that the present application is intended to cover any adaptations, uses, or embodiments of the invention following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. The method of generating an irregular gear which consists in selecting a gear-shaped cutter operable to cut on movement in a substantially axial direction and having cutting teeth of uniform shape and thickness equally spaced about a geometric center and rotating said cutter about an axis eccentric of said center in engagement with a continuously rotating gear blank.

2. The method of generating an irregular gear which consists in selecting a gear-shaped cutter operable to cut on movement in a substantially axial direction and having cutting teeth of uniform shape and thickness equally spaced about a geometric center and rotating said cutter at a uniform velocity about an axis eccentric of said center in engagement with a uniformly rotating gear blank.

3. The method of generating an irregular gear which consists in selecting a gear-shaped cutter operable to cut on movement in a substantially axial direction and having cutting teeth of uniform shape and thickness equally spaced about a geometric center, the number of said teeth being a factor of the number of teeth to be cut in the blank and rotating said cutter in engagement with a continuously rotating gear blank about an axis eccentric of said center an integral number of times while the blank is making one revolution.

4. A machine for generating irregular gears comprising a work support, a gear-shaped cutter operable to cut on movement in a substantially axial direction, and having cutting teeth of uniform shape and thickness uniformly spaced about a common center means for rotating the gear-shaped cutter and work support on their respective axes at uniform velocities, and means for moving the cutter toward and away from the axis of the work support while the blank is making a revolution.

5. A machine for generating irregular gears comprising a work support, a cutter spindle, a gear-shaped cutter having a plurality of cutting teeth of uniform shape and thickness equally spaced about a geometric center and mounted on said spindle with the axis of the spindle eccentric of said center, means for reciprocating and rotating the cutter spindle, and means for rotating the work support on its axis.

6. A machine for generating irregular gears comprising a work support, a cutter spindle, a gear-shaped cutter having a plurality of cutting teeth of uniform shape and thickness equally spaced about a common center, said cutter being mounted on said cutter spindle with its center eccentric to the axis of said spindle, means for reciprocating said cutter spindle and for simultaneously rotating the same at a uniform velocity, and means for rotating the work support at a uniform velocity in timed relation with the cutter spindle rotation.

7. A machine for generating irregular gears comprising a work support, a cutter spindle, a gear-shaped cutter having a plurality of cutting teeth of uniform shape and thickness equally spaced about a geometric center and mounted on said spindle so that the axis of said spindle is eccentric of said center, means for rotating the work support, and means for reciprocating and rotating the cutter spindle, the last named means being so timed that the cutter makes an integral number of revolutions while the blank is making one.

8. A machine for generating irregular gears comprising a work support, a cutter spindle, a gear-shaped cutter having a plurality of cutting teeth of uniform shape and thickness equally spaced about a geometric center, the number of said teeth being half the number of teeth to be cut in the blank, and said cutter having an opening formed therein eccentric of said center, said cutter being secured to the cutter spindle with the spindle entering said opening, means for rotating the work support, and means for reciprocating and rotating the cutter spindle, said last named means being so timed that the cutter makes two revolutions during a revolution of the work.

9. The method of generating an irregular gear which comprises selecting a gear-shaped cutter operable to cut on movement in a substantially axial direction and having cutting teeth of uniform shape and thickness equally spaced about a common center, and while reciprocating said tool axially, rotating the cutter and blank at uniform velocities and simultaneously producing a relative movement between the cutter and blank to move the center of the cutter toward and away from the axis of the blank.

ALLAN H. CANDEE.